Aug. 21, 1956

C. B. SMITH 2,759,243

METHOD OF MAKING PRELOADED BEARINGS

Filed Nov. 18, 1952

2 Sheets-Sheet 1

INVENTOR.
Clifford B. Smith
BY
*Jennings, Edmonds, Morton, Carnsew and Taylor*
ATTORNEYS Aug. 21, 1956  C. B. SMITH  2,759,243
METHOD OF MAKING PRELOADED BEARINGS
Filed Nov. 18, 1952  2 Sheets-Sheet 2
FIG. 4
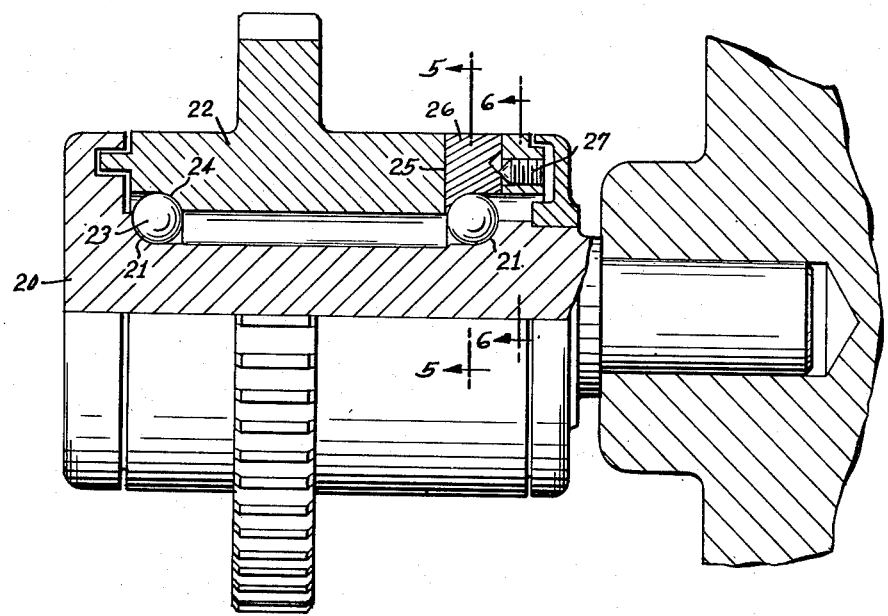
FIG. 5
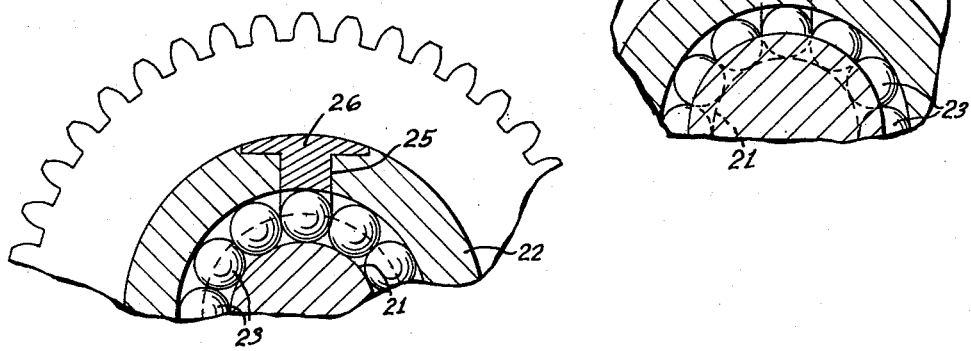
FIG. 6
INVENTOR.
Clifford B. Smith
BY
ATTORNEYS

United States Patent Office 2,759,243
Patented Aug. 21, 1956

2,759,243

METHOD OF MAKING PRELOADED BEARINGS

Clifford B. Smith, Birmingham, Mich., assignor to Vinco Corporation, Detroit, Mich., a corporation of Michigan Application November 18, 1952, Serial No. 321,105

2 Claims. (Cl. 29—148.4)

This invention relates to methods of manufacturing preloaded ball bearings wherein accurately preloaded bearing may be made at a manufacturing cost but little over the cost of similar bearings which are not preloaded.

A special object of the present invention is a particular method of assembling ball bearings by forcing a plug into an opening in which the final ball projects to force said ball into annular alignment.

Preloaded bearings wherein the balls and races are under a certain degree of compression when assembled are useful in precision instruments where lost motion in the bearing must be avoided so that the rotating part will remain accurately centered at all times. An ordinary ball bearing, that is, one which is not preloaded, will under load develop some lost motion, depending on the relation of the load to the size of the bearing and the compressibility of the metal. Since there is very little variation in the compressibility of the different steels used in the manufacture of bearings the lost motion resulting from loading of the bearing may be said to be dependent on the ratio of the load to the size of the bearing. By preloading the bearing the lost motion resulting from a given size is materially reduced. That is to say, there will be no lost motion until the load on the bearing exceeds the preload placed on the metal of the bearing when the bearing is assembled. Hence, for a given load and a given lost motion tolerance, a smaller preloaded bearing can be used than one that is not preloaded.

By my improved process preloaded bearings of any desired degree of preload may be made from the same parts as standard bearings which are not preloaded and at a cost but little more than that of ordinary bearings.

My improved process is applicable to bearings of all types and in the accompanying drawings I have illustrated several types of bearings which may be made by my improved method.

Figure 1:
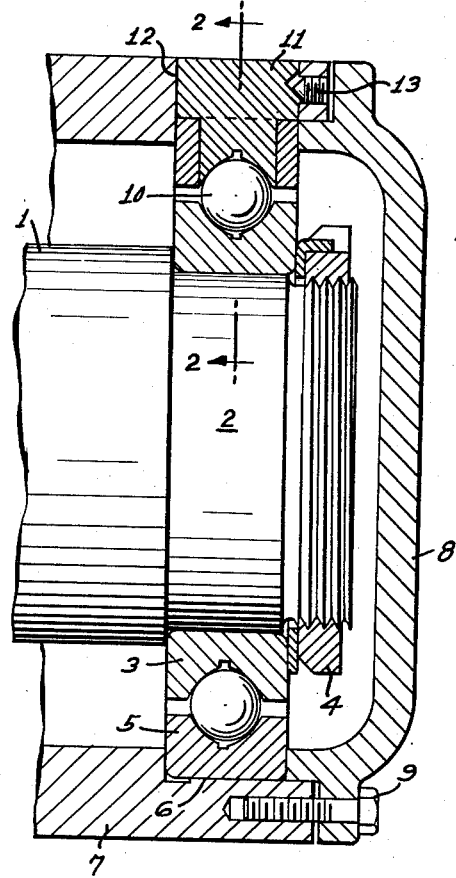
Figure 2:
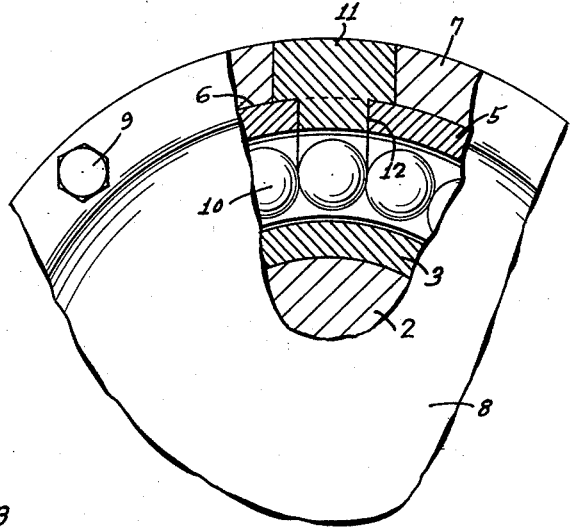

In Figs. 1 and 2 I have illustrated a single-row, radial bearing wherein the ball races are formed of single rings with corresponding ball grooves.

Figure 3:
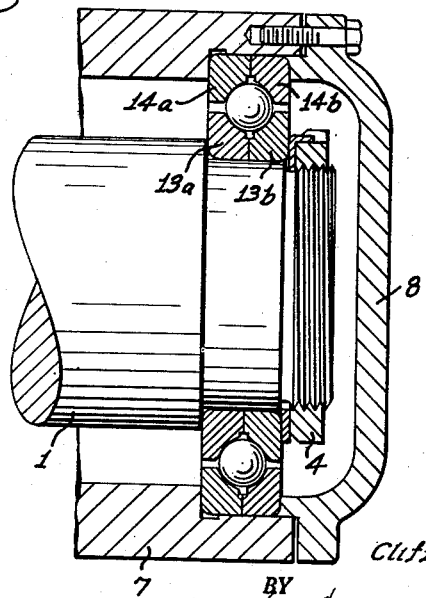

In Fig. 3 I have shown a type of bearing wherein each ball race is formed of two separate rings with matching grooves.

In Figs. 4, 5 and 6 I have illustrated a common form of 45° bearing wherein the races are formed, respectively, on the spindle and on the hub of the rotating part.

The bearing illustrated in Figs. 1 and 2 consists of a spindle 1 having a reduced end portion 2 for receiving the inner ball race 3 with a threaded extension for the clamp nut 4. The outer ball race 5 is seated in an annular groove 6 at the outer end of the hub 7 of the rotating member and is held in place by a cap 8 fastened to the hub by screws 9 in the usual manner. The parts shown and described constitute a common type of bearing which is widely used in a great variety of machines.

In assembling a bearing of this type the balls 10 are added to the bearing after the above described parts are assembled. This is accomplished by the provision of a plug 11 which is seated in a hole 12 in the hub and overlying a hole of smaller diameter in the outer ball race. The plug 11 has an outer part of a diameter to fit the hole in the hub and an extension of smaller diameter to fit the hole in the ball race. The inner end of the plug is shaped to conform with the shape of the ball race and is preferably hardened and ground so as to form a smooth continuation of the ball race. The plug is held in place by a tapered screw 13 as shown in Fig. 1.

To preload this bearing several sizes of presorted bearing balls varying in size by minute dimensions, say, for example, five ten-thousandths of an inch, are supplied. Bearing balls are normally so graded by the manufacturer and are accurate to plus or minus one ten-thousandth of an inch.

After the parts are assembled, except the balls, the operator fills the ball race with balls of the largest size that will permit the plug 11 to be pushed into place without the application of significant force. When loaded with balls of this size the bearing contains the largest balls which can be used in a free-running non-preloaded bearing. After determining the size of the balls to produce a non-preloaded bearing, the operator removes these balls and substitutes balls of larger diameter, either five ten-thousandths or ten ten-thousandths larger, depending upon the degree of preload to be supplied to the bearing. In assembling these larger balls of the bearing the plug 11 is pushed down against the last ball, which requires the application of some little force. The plug is then fastened in place by screwing in the screw 13 to thereby seat the head of the plug firmly against the outer wall of the ball race. The bearing will be now accurately preloaded to the extent desired, and will not develop lost motion until loaded to a point where the metal is compressed beyond that supplied by the preloading.

The bearing shown in Fig. 3 may be made in the same manner above described, that is, by substituting larger balls after the bearing is assembled with the balls of proper size to allow no lost motion when the bearing is running without load. This bearing, however, may be preloaded by altering the size of the race instead of the size of the balls. In the bearing of Fig. 3 the inner ball race is formed of two parts 13a and 13b which are separated along their median transverse plane. Similarly, the outer race is formed of two parts 14a and 14b.

In assembling this bearing the balls are assembled between the two halves of the two races and the assembled bearing then placed between the spindle 1 and hub 7, and clamped in place by the clamping nut 4 and cap 8. The bearing is first assembled with balls of a size such that the two halves of the two races can be pressed into contact without the application of significant force. The balls can then be removed and larger balls substituted, as above described, or the meeting faces of the two halves of the two races may be ground off a few ten-thousandths of an inch, depending upon the degree of preload which it is desired to give to the bearing. The bearing is then reassembled and the two halves of the two races clamped together by means of the clamping nut and cap.

A bearing such as illustrated in Figs. 4, 5 and 6 where the races are formed directly on the relatively rotating parts may be preloaded in the same manner as the bearing shown in Figs. 1 and 2. The bearing here shown comprises a spindle 20 having spaced ball races 21 near each end of the spindle, the races being each at an angle of 45° to the axis of rotation so that the bearing serves both as a radial bearing and a double thrust bearing. The rotating member comprises a gear with an integral hub 22 formed with races 24 complementary to those on the spindle.

In assembling this bearing the balls 23 at the outer end of the bearing are assembled between the two races, with the axes of spindle 20 and hub 22 vertical, the outer end of spindle 20 is uppermost and raised within hub 22 to provide a sufficient annular gap for the introduction of the balls. Hub 22 and spindle 20 are then shifted to the relative position shown in Fig. 4 to hold this row of balls in place. The balls of the other bearing are then dropped through an opening 25 in the hub, which opening is closed by a plug 26 similar to the plug 11 above described, and held in place by a screw 27.

The balls thus selected as above described are of the proper size to provide no lost motion when freely rotating under no-load conditions. The balls at the inner end of the bearing are then removed and balls of five or ten ten-thousandths greater diameter substituted, the last ball being pressed into place by force exerted through the plug 26. This forcing of the last ball in place preloads both sets of bearings as the pressure of the balls against the race as the last ball is forced into place tends to shift the gear to the left against the other set of balls so that the resulting compression in the metal is distributed equally between both bearings.

By my improved process the cost of preloading bearings is reduced to an insignificant addition over the cost of non-preloaded bearings. No greater precision is required in the manufacture of the parts, the accurate preloading being obtained not by precise manufacture of the races, but by a cut-and-try selection of the balls which are always of precise dimension because they are sorted after manufacture by mechanical sorting devices which operate with great precision.

In the foregoing specification and drawing I have described and shown several different types of bearings and how my improved method of manufacture can be applied thereto. It will be understood, however, that the invention is not limited to the bearings illustrated, but on the contrary, the same principle may be applied to various other forms of bearings, and the appended claims are not to be construed to be limited to any particular type of bearings except as insofar as recited in the claims.

I claim:
1. The method of making preloaded bearings which comprises providing opposed ball races one of which has a filling opening and a removable closing plug, inserting bearing balls into the race through said opening of such size that the final ball projects partially into said opening, and then forcing said plug into said opening to an extent to maintain said ball in annular alignment with the other balls of said bearing, and locking said plug in such position.

2. The method of making double row preloaded bearings which comprises providing two axially spaced ball races which are opposed in the axial direction at least in part, each of said races comprising a pair of race members, and one member of one pair of which has a filling opening and a removable closing plug, supporting the bearing with its axis extending in an upward direction and with the ball race at the top which does not have a filling opening, axially separating said race members and filling said upper ball race by inserting bearing balls therein and reclosing said race members, then inserting into the unfilled ball race through said filling opening bearing balls of such size that the final ball projects partially into said opening, and then forcing said plug into said opening to an extent to maintain said ball in annular alignment with the other balls of said race thereby simultaneously preloading the balls of both of said races, and locking said plug in such position.

References Cited in the file of this patent
UNITED STATES PATENTS

| | | |
|---|---|---|
| 327,408 | Pihlfeldt | Sept. 29, 1885 |
| 777,698 | Sharp | Dec. 20, 1904 |
| 1,622,578 | Ellwein | Mar. 29, 1927 |
| 1,722,492 | Brünner | July 30, 1929 |
| 2,037,982 | Hughes | Apr. 21, 1936 |
| 2,259,324 | Robinson | Oct. 24, 1941 |
| 2,606,361 | Keller | Aug. 12, 1952 |

OTHER REFERENCES

Roller Bearings (R. K. Allan), published by Pitman Publishing Corp., second edition, 1946. Page 237, lines 11 to 13 relied on.